(12) United States Patent
Matsushima

(10) Patent No.: US 10,317,752 B2
(45) Date of Patent: Jun. 11, 2019

(54) LIQUID CRYSTAL DISPLAY DEVICE

(71) Applicant: Japan Display Inc., Minato-ku (JP)

(72) Inventor: Toshiharu Matsushima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/848,308

(22) Filed: Dec. 20, 2017

(65) Prior Publication Data

US 2018/0203306 A1   Jul. 19, 2018

(30) Foreign Application Priority Data

Jan. 19, 2017   (JP) .................................. 2017-007599

(51) Int. Cl.
  *G02F 1/1343*  (2006.01)
  *G02F 1/1333*  (2006.01)
  *G02F 1/1337*  (2006.01)
  *G02F 1/1335*  (2006.01)

(52) U.S. Cl.
  CPC .. *G02F 1/134336* (2013.01); *G02F 1/133514* (2013.01); *G02F 1/134309* (2013.01); *G02F 2001/134345* (2013.01); *G02F 2001/134372* (2013.01)

(58) Field of Classification Search
  CPC .. G02F 1/136; G02F 1/136286; G02F 1/1368; G02F 1/134309; G02F 1/133345; G02F 1/134363; G02F 1/136227; G02F 1/1335; G02F 1/133512; G02F 1/134336; G02F 1/133514; G02F 1/133707; G02F 1/1337; G02F 1/136209; G02F 1/1362; G02F 1/1343; G02F 1/133528; G02F 1/1333; G02F 2201/123; G02F 2001/134372; G02F 2001/134318; G02F 2001/134345; G02F 1/136213; G02F 2001/133357; G09G 3/3648; G09G 2300/0426; G09G 2300/0447; G09G 2300/0809; G09G 2320/0252
  See application file for complete search history.

(56) References Cited

U.S. PATENT DOCUMENTS

| 9,298,051 B2 | 3/2016 | Matsushima | |
| 9,383,614 B2 | 7/2016 | Matsushima | |
| 2009/0059110 A1* | 3/2009 | Sasaki | G02F 1/134363 349/39 |
| 2016/0161811 A1 | 6/2016 | Matsushima | |
| 2016/0299390 A1 | 10/2016 | Matsushima | |

FOREIGN PATENT DOCUMENTS

| JP | 2013-109309 | 6/2013 |
| JP | 2014-71309 | 4/2014 |

* cited by examiner

*Primary Examiner* — Thoi V Duong
(74) *Attorney, Agent, or Firm* — Oblon, McClelland, Maier & Neustadt, L.L.P.

(57) ABSTRACT

In one embodiment, a liquid crystal display device comprises a first and second substrates and a liquid crystal layer. The first substrate comprises subpixels, first and second common electrodes, and a pixel electrode. Each of the subpixels comprises an axial area, branch areas, and gap areas. The second edge comprises concave portions. The axial and branch areas are areas in which the second common electrode is not present, and the pixel electrode is present. The gap areas are areas in which the second common electrode is present. The concave portions are areas in which the second common electrode and the pixel electrode are not present, and the first common electrode is present.

10 Claims, 15 Drawing Sheets

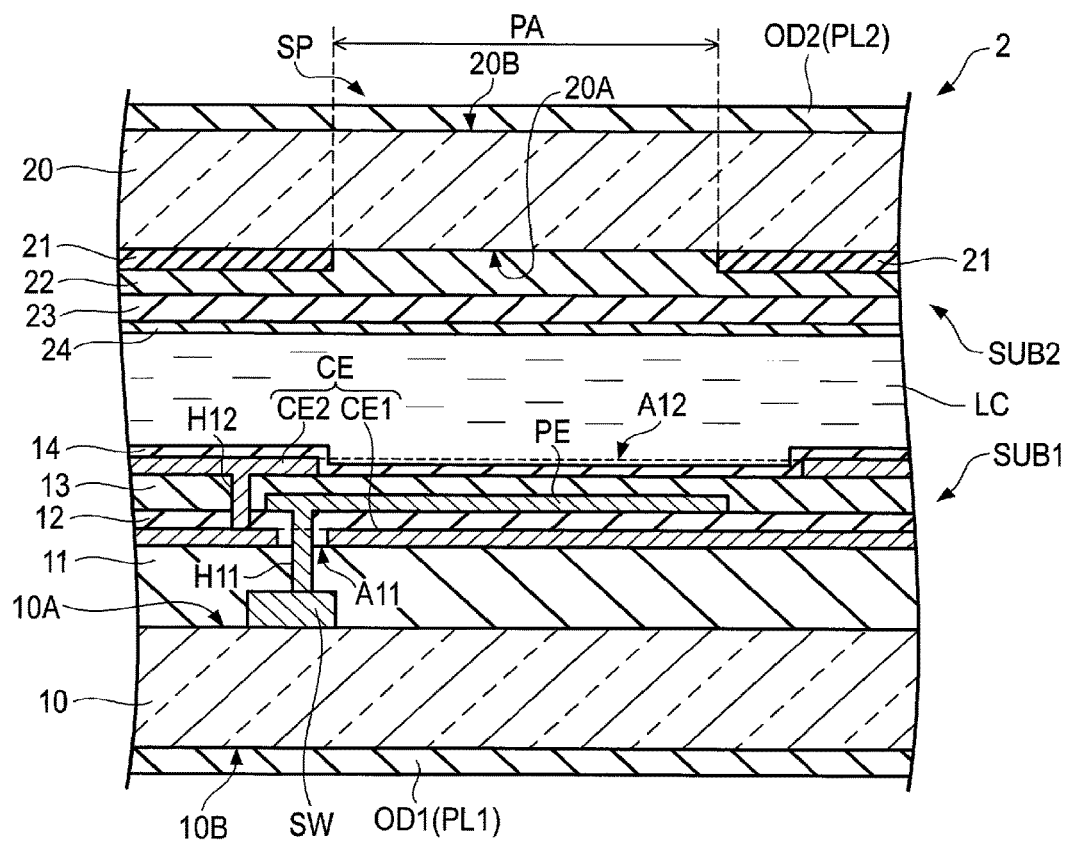
F I G. 3

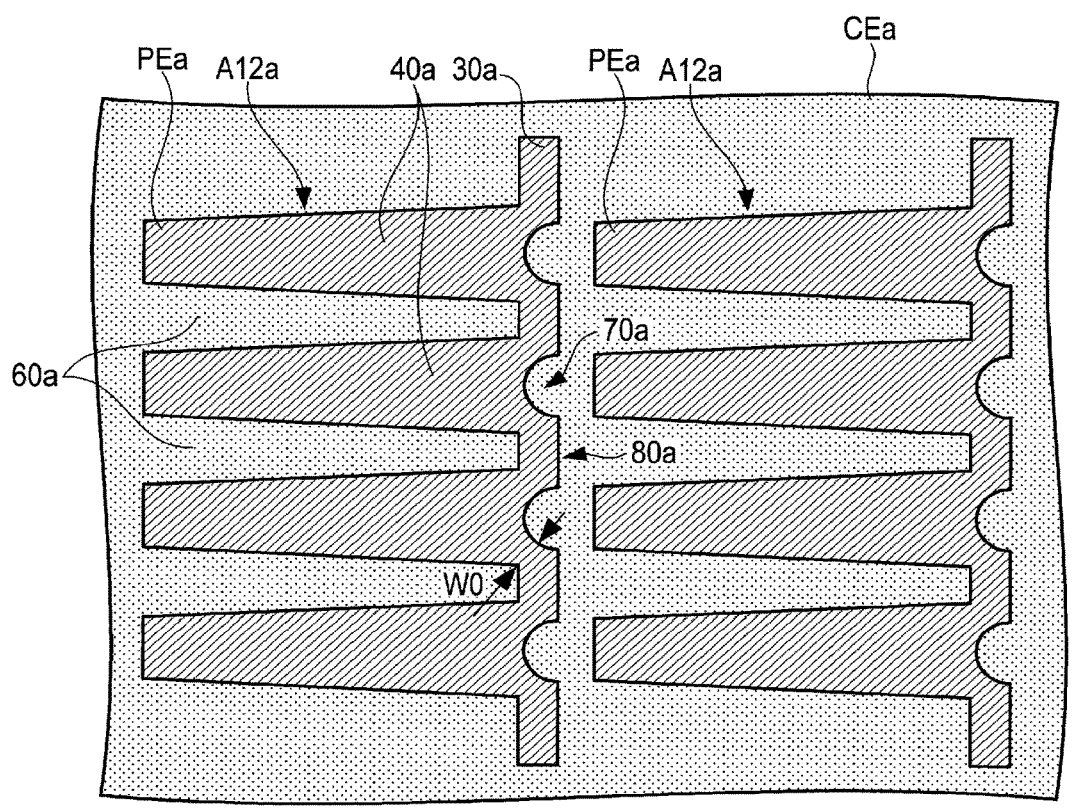
F I G. 10

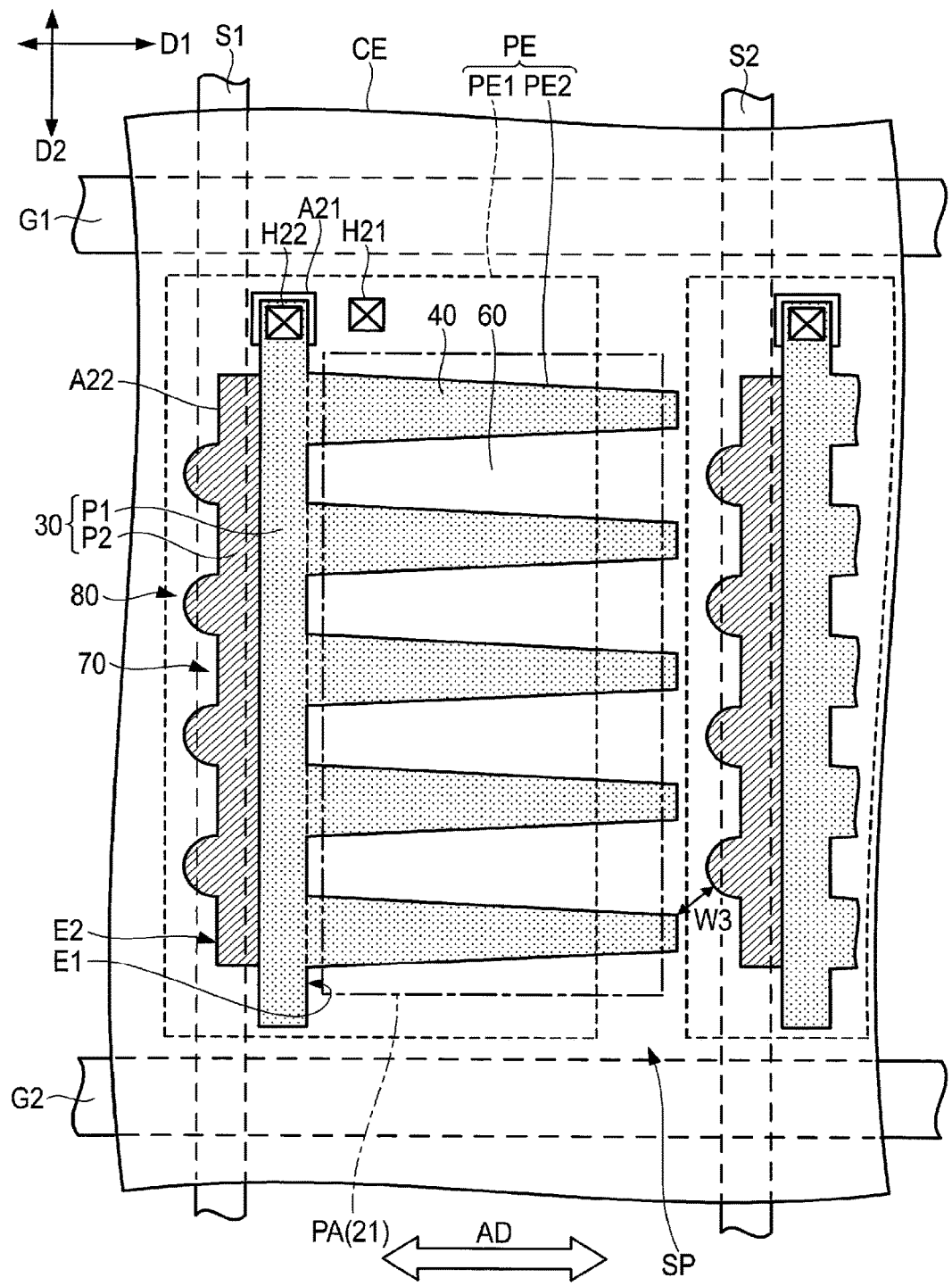
F I G. 13

LIQUID CRYSTAL DISPLAY DEVICE

CROSS-REFERENCE TO RELATED APPLICATIONS

This application is based upon and claims the benefit of priority from Japanese Patent Application No. 2017-007599, filed Jan. 19, 2017, the entire contents of which are incorporated herein by reference.

FIELD

Embodiments described herein relate generally to a liquid crystal display device.

BACKGROUND

A liquid crystal display device in an in-plane switching (IPS) mode is known as an example of a display device. The liquid crystal display device in an IPS mode comprises a pair of substrates facing each other via a liquid crystal layer. One of the substrates comprises a pixel electrode and a common electrode. The alignment of the liquid crystal molecules of the liquid crystal layer is controlled using the lateral electric field generated between the electrodes. In IPS modes, a liquid crystal display device in a fringe-field switching (FFS) mode has been put to practical use. In the liquid crystal display device in an FFS mode, a pixel electrode and a common electrode are provided in different layers, and the fringe electric field generated between the electrodes is used to control the alignment of liquid crystal molecules.

Apart from the above, the following liquid crystal display device is suggested. In the liquid crystal display device, a pixel electrode and a common electrode are provided in different layers. A slit is provided in the electrode closer to a liquid crystal layer than the other electrode. The liquid crystal molecules near the both sides of the slit in the width direction are rotated in opposite directions. This liquid crystal display device is a type of FFS mode. However, the form of the rotation of the liquid crystal molecules of this liquid crystal display device is clearly different from that of the conventional FFS mode which has been widely known. This mode can increase the speed of response and improve the stability of alignment in comparison with the conventional FFS mode. Hereinafter, the structure of this type of liquid crystal display device is called a high-speed response mode.

BRIEF DESCRIPTION OF THE DRAWINGS

FIG. 3 shows an example of the cross-sectional surface of the display device according to the first embodiment.

FIG. 10 shows a comparison example of the first embodiment.

FIG. 13 is a plan view schematically showing an example of a subpixel according to the second embodiment.

DETAILED DESCRIPTION

Figure 1:
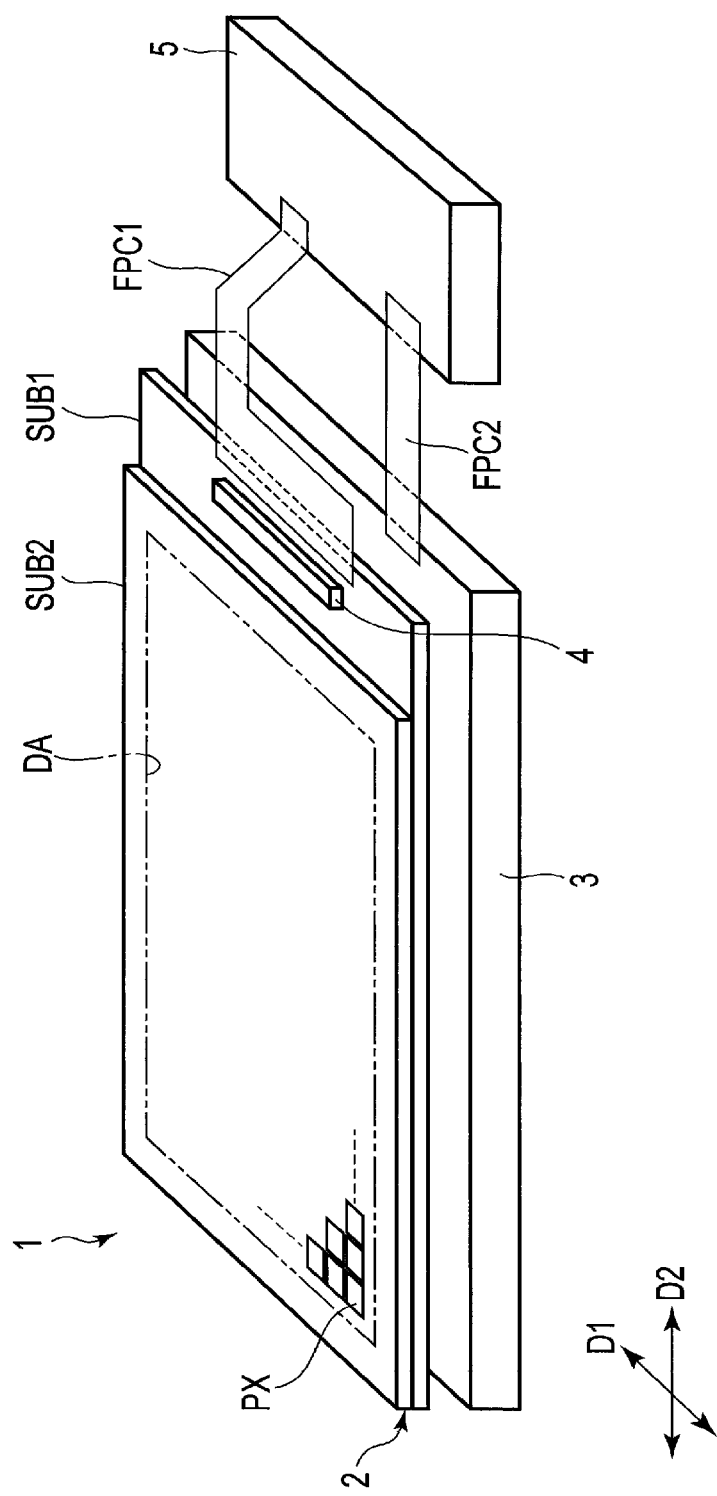
FIG. 1 is a perspective view showing the schematic structure of a display device according to a first embodiment.

In general, according to one embodiment, a liquid crystal display device comprises a first substrate; a second substrate; and a liquid crystal layer provided between the first substrate and the second substrate, and including liquid crystal molecules. The first substrate comprises a plurality of subpixels; a first common electrode having common potential; a second common electrode between the first common electrode and the liquid crystal layer, and having the common potential; and a pixel electrode between the first common electrode and the second common electrode, provided for each of the subpixels and having pixel potential. Each of the subpixels comprises an axial area comprising first and second edges arranged in a first direction, and extending in a second direction intersecting the first direction; a plurality of branch areas extending from the first edge of the axial area in the first direction; and a plurality of gap areas between the branch areas. The second edge comprises a plurality of concave portions arranged in the second direction. The axial area and the branch areas are areas in which the second common electrode is not present, and the pixel electrode is present. The gap areas are areas in which the second common electrode is present. The concave portions are areas in which the second common electrode and the pixel electrode are not present, and the first common electrode is present.

According to another embodiment, a liquid crystal display device comprises a first substrate; a second substrate; and a liquid crystal layer provided between the first substrate and the second substrate, and including liquid crystal molecules. The first substrate comprises a plurality of subpixels; a first pixel electrode provided for each of the subpixels, and having pixel potential; a second pixel electrode between the first pixel electrode and the liquid crystal layer, provided for each of the subpixels, and having pixel potential; and a common electrode between the first pixel electrode and the second pixel electrode, and having common potential. Each of the subpixels comprises an axial area comprising first and second edges arranged in a first direction, and extending in a second direction intersecting the first direction; a plurality of branch areas extending from the first edge of the axial area in the first direction; and a plurality of gap areas between the branch areas. The second edge comprises a plurality of convex portions arranged in the second direction. The branch areas are areas in which the second pixel electrode is present. The gap areas are areas in which the second pixel electrode is not present, and the common electrode is present. The convex portions are areas in which the second pixel electrode and the common electrode are not present, and the first pixel electrode is present.

The above structures allow the provision of a liquid crystal display device in high-speed response mode in which the stability of alignment has been further improved.

Embodiments will be described with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In this specification, the phrases "α includes A, B or C", "α includes one of A, B and C" and "α includes an element selected from a group consisting of A, B and C" do not exclude a case where a includes a plurality of combinations of A to C unless specified. Further, these phrases do not exclude a case where α includes other elements.

In this specification, the expressions "first" "second" and "third" of "the first member, the second member and the third member" are merely ordinal numbers used to explain the elements for the sake of convenience. Thus, the expression "A comprises the third member" includes a case where A does not comprise the first member and the second member unless otherwise specified.

In each embodiment, a transmissive type liquid crystal display device is disclosed as an example of a liquid crystal display device. However, each embodiment does not prevent application of individual technical ideas disclosed in the embodiment to other types of display devices. Other types of display devices are assumed to include, for example, a reflective type liquid crystal display device which displays an image using outside light, and a liquid crystal display device having both the transmissive function and the reflective function.

First Embodiment

FIG. 1 is a perspective view showing the schematic structure of a liquid crystal display device (hereinafter referred to as a display device) 1 according to a first embodiment. The display device 1 may be used for various devices such as a smartphone, a tablet, a mobile phone, a personal computer, a television receiver, a vehicle-mounted device, a game console and a wearable device.

The display device 1 comprises a display panel 2, a backlight 3 facing the display panel 2, a driver IC 4 which drives the display panel 2, a control module 5 which controls the operation of the display panel 2 and the backlight 3, and flexible circuit boards FPC1 and FPC2 which transmit a control signal to the display panel 2 and the backlight 3.

In the present embodiment, a first direction D1 is the direction in which each branch area 40 extends as described later. A second direction D2 is the direction in which an axial area 30 extends as described later. In FIG. 1, the first direction D1 is also applicable to the direction along the short sides of the display panel 2. The second direction D2 is also applicable to, for example, the direction along the long sides of the display panel 2. In the example shown in FIG. 1, the first direction D1 intersects the second direction D2 at right angle. However, the first and second directions D1 and D2 may intersect at another angle.

The display panel 2 comprises first and second substrates SUB1 SUB2 facing each other, and a liquid crystal layer (the liquid crystal layer LC described later) provided between the first substrate SUB1 and the second substrate SUB2. The display panel 2 comprises a display area DA which displays an image. The display panel 2 comprises, for example, a plurality of pixels PX arranged in matrix in the first and second directions D1 and D2 in the display area DA.

Figure 2:
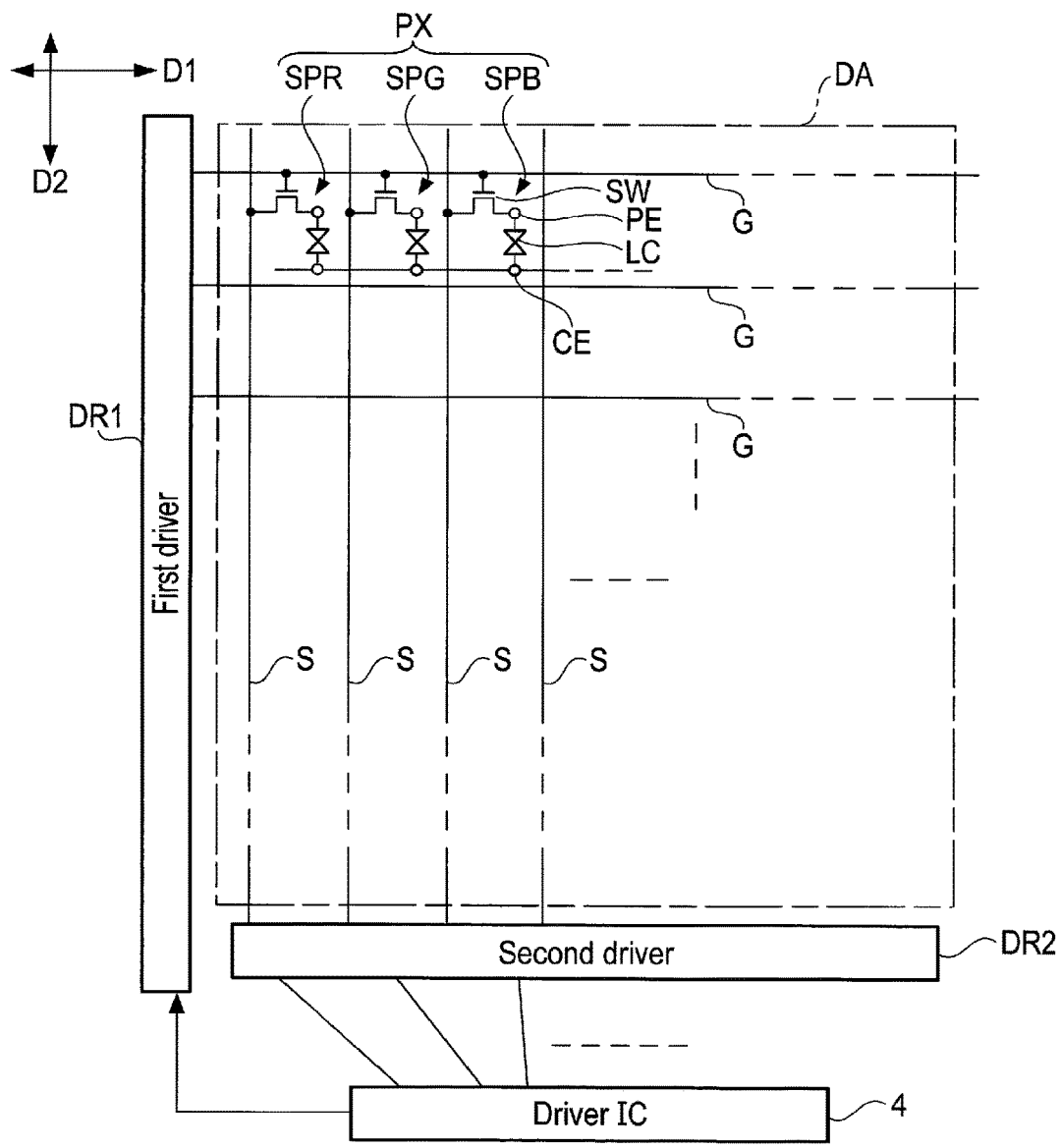
FIG. 2 shows the schematic equivalent circuit of the display device according to the first embodiment.

FIG. 2 shows the schematic equivalent circuit of the display device 1. The display device 1 comprises a first driver DR1, a second driver DR2, a plurality of scanning signal lines G connected to the first driver DR1, and a plurality of video signal lines S connected to the second driver DR2. The scanning signal lines G extend in the first direction D1 and are arranged in the second direction D2 in the display area DA. In the display area DA, the video signal lines S extend in the second direction D2, are arranged in the first direction D1, and intersect the scanning signal lines G.

Each pixel PX comprises a plurality of subpixels SP. In the present embodiment, it is assumed that each pixel PX includes a subpixel SPR corresponding to red, a subpixel SPG corresponding to green and a subpixel SPB corresponding to blue. However, each pixel PX may further include, for example, a subpixel SP corresponding to white, or may include a plurality of subpixels SP corresponding to the same color. In this disclosure, each subpixel may be simply referred to as a pixel.

Each subpixel SP comprises a switching element SW, a pixel electrode PE and a common electrode CE facing the pixel electrode PE. The common electrode CE is formed over a plurality of subpixels SP. Common potential is applied to the common electrode CE. Each switching element SW is connected to a corresponding scanning signal line G, a corresponding video signal line S and a corresponding pixel electrode PE. Each pixel electrode PE is electrically connected to a corresponding video signal line S via a corresponding switching element SW.

The first driver DR1 supplies a scanning signal to the scanning signal lines G in series. The second driver DR2 selectively supplies a video signal to the video signal lines S. When a scanning signal is supplied to a scanning signal line G corresponding to a switching element SW, and further when a video signal is supplied to the video signal line S connected to the switching element SW, pixel potential is applied to a corresponding pixel electrode PE in accordance with the video signal. At this time, an electric field is generated between the pixel electrode PE and the common electrode CE. By this electric field, the alignment of the liquid crystal molecules of the liquid crystal layer LC is changed from the initial alignment state where no voltage is applied. By this operation, an image is displayed in the display area DA.

FIG. 3 shows a part of the cross-sectional surface of the display device 1. FIG. 3 shows the schematic cross-sectional surface of a subpixel SP.

The first substrate SUB1 comprises a first insulating substrate 10 such as a phototransmissive glass substrate or resinous substrate. The first insulating substrate 10 comprises a first main surface 10A facing the second substrate SUB2, and a second main surface 10B opposite to the first main surface 10A. The first substrate SUB1 further comprises the switching element SW, the pixel electrode PE, the common electrode CE, a first insulating layer 11, a second insulating layer (first dielectric layer) 12, a third insulating layer (second dielectric layer) 13, and a first alignment film 14. In the present embodiment, the common electrode CE includes a first common electrode CE1 and a second common electrode CE2. The same common potential is applied to the first and second common electrodes CE1 and CE2.

The switching element SW is provided on the first main surface 10A of the first insulating substrate 10, and is covered with the first insulating layer 11. In FIG. 3, the illustration of the scanning signal lines G or the video signal lines S is omitted. Moreover, in FIG. 3, the switching element SW is simplified. In the actual device, the first insulating layer 11 includes a plurality of layers, and the switching element SW includes a semiconductor layer and various electrodes formed in these layers.

The first common electrode CE1 is formed on the first insulating layer 11. The first common electrode CE1 is covered with the second insulating layer 12. The pixel electrode PE is formed on the second insulating layer 12. The pixel electrode PE is connected to the switching element SW via a contact hole H11 penetrating the first and second insulating layers 11 and 12 and an aperture A11 provided in the first common electrode CE1.

The pixel electrode PE is covered with the third insulating layer 13. The second common electrode CE2 is formed on the third insulating layer 13. The second common electrode CE2 is connected to the first common electrode CE1 via a contact hole H12 penetrating the second and third insulating layers 12 and 13. The first alignment film 14 covers the second common electrode CE2 and the third insulating layer 13, and is in contact with the liquid crystal layer LC. The pixel electrode PE and the first and second common electrodes CE1 and CE2 can be formed of a transparent conductive material such as indium tin oxide (ITO).

The second common electrode CE2 comprises an aperture A12. The pixel electrode PE and the first common electrode CE1 are also formed at a position overlapping the aperture A12 as seen in plan view.

The second substrate SUB2 comprises a second insulating substrate 20 such as a phototransmissive glass substrate or resinous substrate. The second insulating substrate 20 comprises a first main surface 20A facing the first substrate SUB1, and a second main surface 20B opposite to the first main surface 20A. The second substrate SUB2 further comprises a light-shielding layer 21, a color filter 22, an overcoat layer 23 and a second alignment film 24. At least one of the light-shielding layer 21 and the color filter 22 may be provided in the first substrate SUB1.

The light-shielding layer 21 is provided at the boundaries of the subpixel SP as seen in plan view. By the light-shielding layer 21 provided in the above manner, a pixel aperture PA which substantially contributes to image display is formed. The color filter 22 covers the first main surface 20A of the second insulating substrate 20 and the light-shielding layer 21. For example, a color corresponding to the subpixel SP is applied to the color filter 22. The overcoat layer 23 covers the color filter 22 and planarizes the surface of the color filter 22. The second alignment film 24 covers the overcoat layer 23, and is in contact with the liquid crystal layer LC.

The first and second alignment films 14 and 24 have a function for causing the liquid crystal molecules included in the liquid crystal layer LC to be aligned in the initial alignment direction. For example, the first and second alignment films 14 and 24 are optical alignment films which underwent optical alignment treatment for adding anisotropy by irradiating a polymer film such as polyimide with ultraviolet light. Alternatively, the first and second alignment films 14 and 24 may be rubbing alignment films which underwent rubbing treatment. One of the first and second alignment films 14 and 24 may be an optical alignment film, and the other one may be a rubbing alignment film.

In the example of FIG. 3, a first optical element OD1 including a first polarizer PL1 is provided on the second main surface 10B of the first insulating substrate 10. A second optical element OD2 including a second polarizer PL2 is provided on the second main surface 20B of the second insulating substrate 20.

Figure 4:
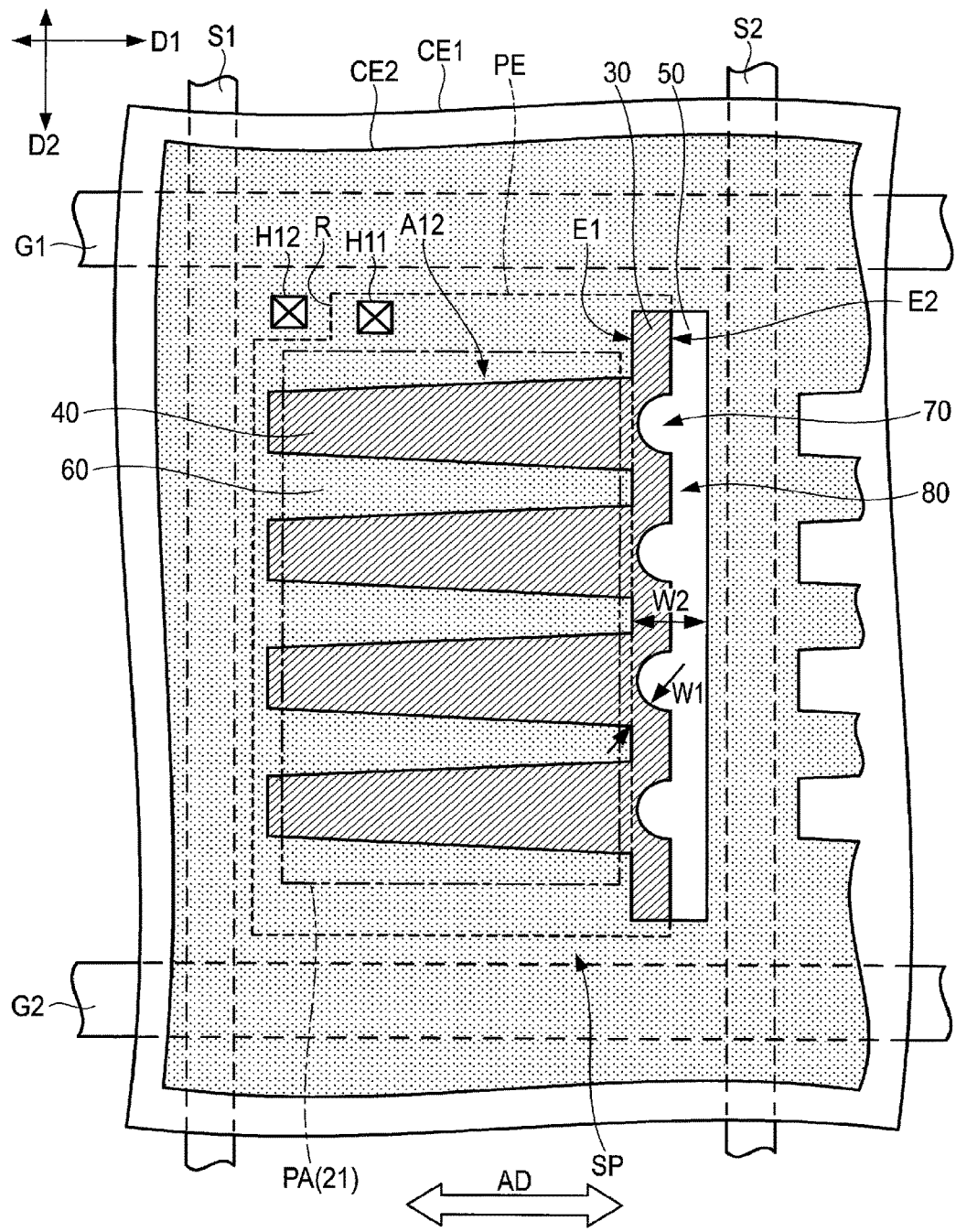
FIG. 4 is a plan view schematically showing an example of a subpixel according to the first embodiment.
Figure 5:
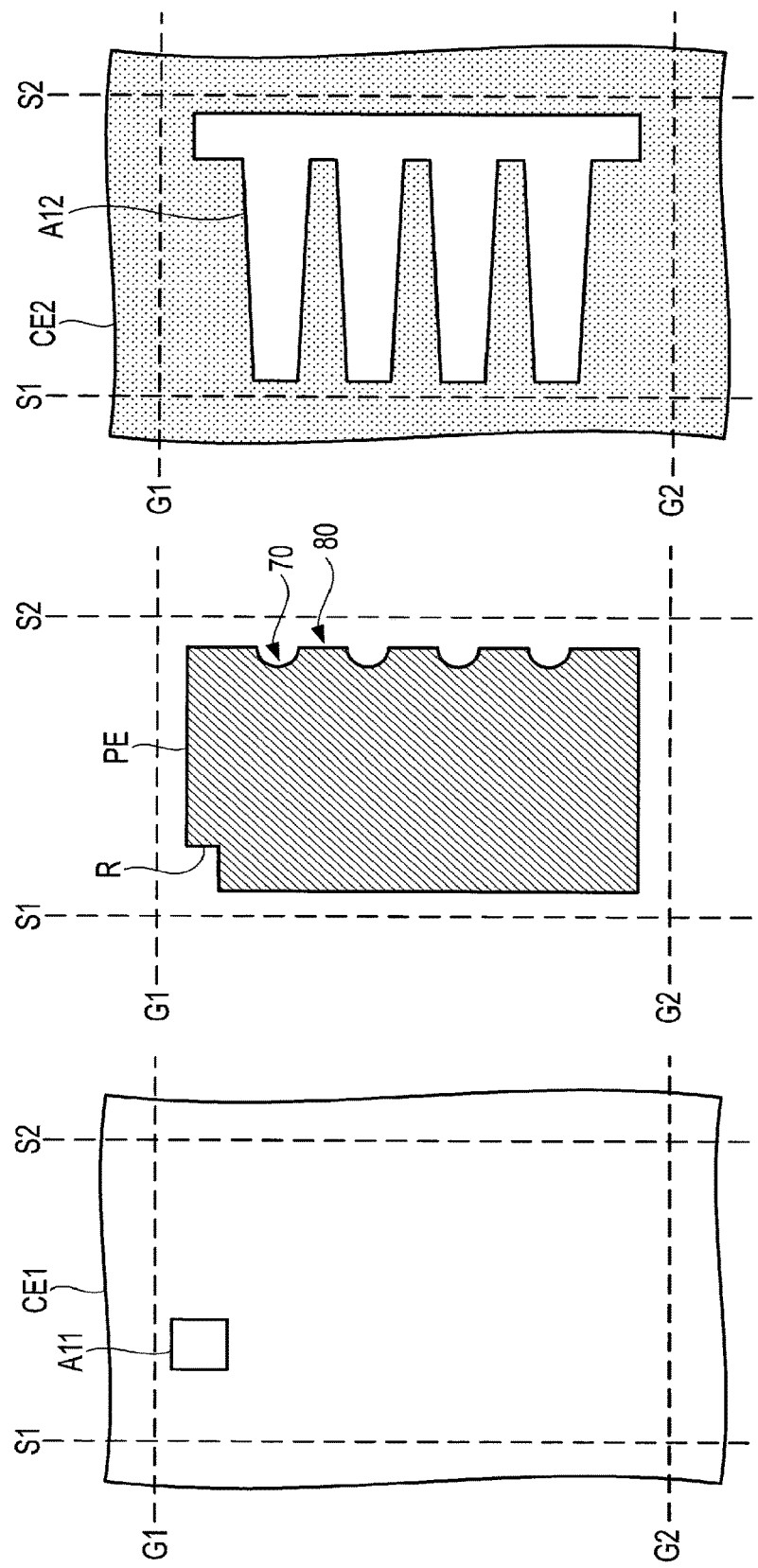
FIG. 5A is a schematic plan view of the first common electrode shown in FIG. 4.
FIG. 5B is a schematic plan view of the pixel electrode shown in FIG. 4.
FIG. 5C is a schematic plan view of the second common electrode shown in FIG. 4.

FIG. 4 is a plan view schematically showing an example of a subpixel SP. FIG. 5A, FIG. 5B and FIG. 5C are the schematic plan views of the first common electrode CE1, the pixel electrode PE and the second common electrode CE2 shown in FIG. 4, respectively. The subpixel SP shown in FIG. 4 corresponds to the area surrounded by two scanning signal lines G (G1 and G2) adjacent to each other in the second direction D2 and two video signal lines S (S1 and S2) adjacent to each other in the first direction D1. The elements such as the above switching element SW are omitted in the figure.

As shown in FIG. 5A, the first common electrode CE1 comprises the aperture A11. The contact hole H1 is provided at a position overlapping the aperture A11 as seen in plan view.

In the examples of FIG. 4 and FIG. 5B, the pixel electrode PE is provided within the area surrounded by the scanning signal lines G1 and G2 and the video signal lines S1 and S2. However, a part of the pixel electrode PE may extend to the outside of the area. As shown in FIG. 4 and FIG. 5B, the pixel electrode PE comprises a concave portion R near the intersection between the scanning signal line G1 and the video signal line S1. The contact hole H12 for connecting the first and second common electrodes CE1 and CE2 is provided in the concave portion R. The contact hole H12 may not be provided in all the subpixels SP. Even when each contact hole H12 is provided for a corresponding group of subpixels SP, the conduction of the first and second common electrodes CE1 and CE2 can be ensured. The first and second common electrodes CE1 and CE2 may be electrically connected in a peripheral area SA.

For example, the first common electrode CE1 overlaps substantially the entire area of the pixel electrode PE and the second common electrode CE2. However, the pixel electrode PE and the second common electrode CE2 may comprise a portion which does not overlap the first common electrode CE1.

As shown in FIG. 4 and FIG. 5C, the second common electrode CE2 comprises the aperture A12. The aperture A12 includes the axial area 30, a plurality of branch areas 40 and an extension area 50. The axial area 30 extends in the second direction D2, and is close to the video signal line S2. The axial area 30 comprises a first edge E1 on the video signal line S1 side, and a second edge E2 on the video signal line S2 side.

Each branch area 40 extends in the first direction D1 from the first edge E1 of the axial area 30 to the video signal line S1. For example, each branch area 40 has a shape tapering toward the distal end. A gap area 60 is formed between two branch areas 40 adjacent to each other in the second direction D2. The extension area 50 extends in the second direction D2 along the second edge E2 of the axial area 30.

In the example of FIG. 4, all the branch areas 40 have the same shape, and are arranged at regular pitches in the second direction D2. Similarly, all the gap areas 60 have the same shape, and are arranged at regular pitches in the second direction D2. However, all the branch areas 40 or all the gap areas 60 may not have the same shape, or may not be arranged at regular pitches. One or some of them may have a different shape. Some of them may be arranged at a different pitch.

In the example of FIG. 4, the end portions of the axial area 30 in the second direction D2 are aligned with the end portions of the extension area 50 in the second direction D2. However, on at least one of the scanning signal line G1 side and the scanning signal line G2 side, the end potion of the axial area 30 may not be aligned with the end portion of the extension area 50.

The pixel aperture PA indicated with the alternate long and short dash line overlaps each branch area 40 and each gap area 60. In the example of FIG. 4, none of the distal and proximal portions of the branch areas 40 and the gap areas 60 is included in the pixel aperture PA. In other words, the distal and proximal portions of each branch area 40 and each gap area 60 overlap the light-shielding layer 21. The axial area 30, the extension area 50, the scanning signal lines G1 and G2, the video signal lines S1 and S2, and the contact holes H11 and H12 also overlap the light-shielding layer 21. However, the light-shielding layer 21 may not overlap at least a part of the axial area 30 and the extension area 50. The light-shielding layer 21 may not overlap at least one of the distal portion and the proximal portion of each branch area 40 and each gap area 60.

The second edge E2 of the axial area 30 comprises a plurality of concave portions 70 arranged in the second direction D2. Each concave portion 70 is aligned with a corresponding branch area 40 in the first direction D1. For example, the center of each branch area 40 in the second direction D2 may match the center of a corresponding concave portion 70 in the second direction D2 (for example, the deepest position on the branch area 40 side). Although FIG. 4 shows that each concave portion 70 is semicircular, the shape of each concave portion 70 is not limited to this example.

In another respect, the second edge E2 of the axial area 30 comprises a plurality of convex portions 80 arranged in the second direction D2. Each convex portion 80 is aligned with a corresponding gap area 60 in the first direction D1. For example, the center of each gap area 60 in the second direction D2 may match the center of a corresponding convex portion 80 in the second direction D2 (for example, the projecting position closest to the extension area 50).

In the present embodiment, the axial area 30 and each branch area 40 are areas in which the second common electrode CE2 is not present, and the pixel electrode PE is present. Thus, the second edge E2 is equivalent to the edge of the pixel electrode PE on the video signal line S2 side. Each gap area 60 is an area in which the second common electrode CE2 is present. The extension area 50 is an area in which the second common electrode CE2 and the pixel electrode PE are not present, and the first common electrode CE1 is present. Thus, each concave portion 70 (more precisely, the extension area 50 on the internal side of each concave portion 70) is an area in which the second common electrode CE2 and the pixel electrode PE are not present, and the first common electrode CE1 is present. The other area is an area in which the second common electrode CE2 is present. In this structure, the axial area 30 and each branch area 40 have pixel potential, and the other area has common potential.

Alignment treatment is applied to the first alignment film 14 and the second alignment film 24 shown in FIG. 3 in an alignment treatment direction AD parallel to the first direction D1. Thus, the first and second alignment films 14 and 24 have a function for causing the liquid crystal molecules to be aligned in the initial alignment direction parallel to the alignment treatment direction AD. In the present embodiment, the extension directions of the branch areas 40 and the gap areas 60 are identical with the initial alignment direction of the liquid crystal molecules.

Figure 6:
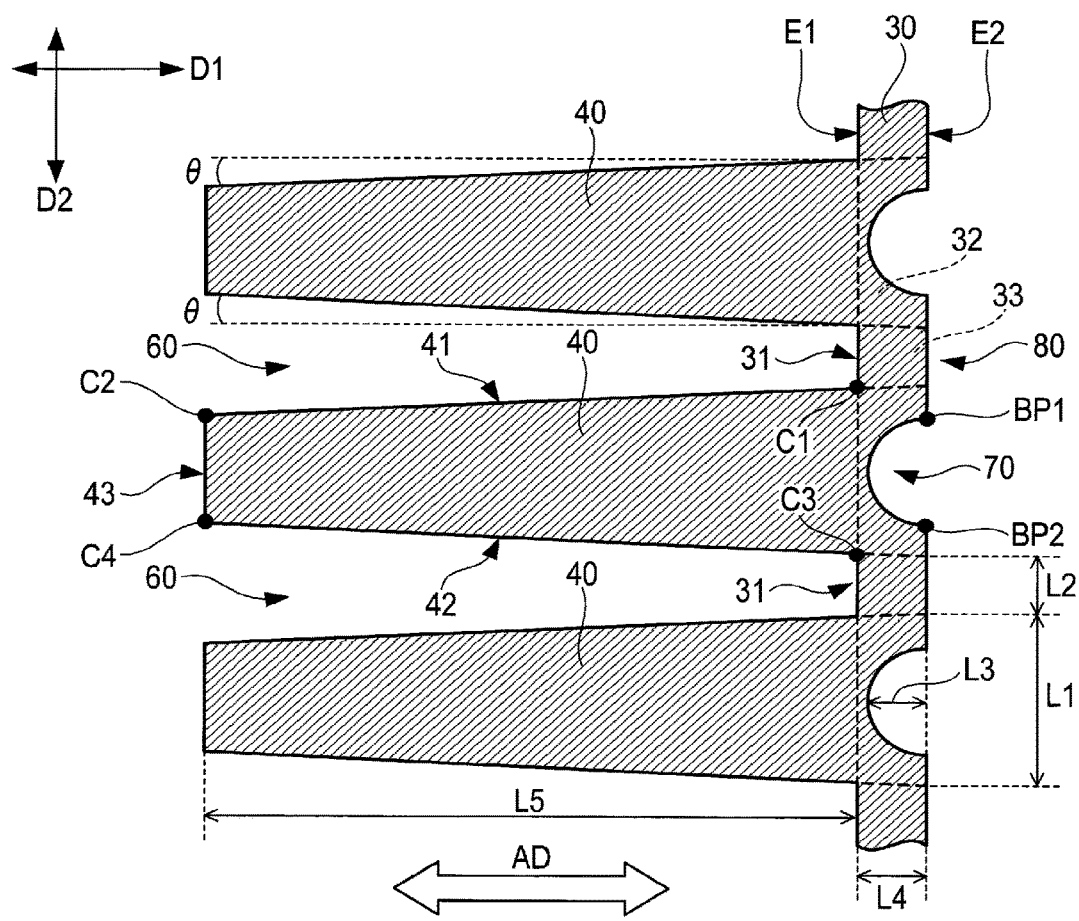
FIG. 6 is a partial enlarged view of the axial area and each branch area shown in FIG. 4.

Now, this specification explains the details of the shapes of the axial area 30 and the branch areas 40 which have pixel potential. FIG. 6 is a partial enlarged view of the axial area 30 and each branch area 40 shown in FIG. 4. Each branch area 40 comprises a first side 41 and a second side 42 in the second direction D2. Each branch area 40 further comprises a top side 43 connecting the first side 41 and the second side 42 at the distal end. The axial area 30 comprises a bottom side 31 between two adjacent branch areas 40. Each first side 41 is inclined at an angle θ which is an acute angle in a counterclockwise direction (for example, approximately 1 degree) with respect to the alignment treatment direction AD. Each second side 42 is inclined at the angle θ in a clockwise direction with respect to the alignment treatment direction AD.

A corner C1 is formed by the bottom side 31 and the first side 41. A corner C2 is formed by the first side 41 and the top side 43. A corner C3 is formed by the bottom side 31 and the second side 42. A corner C4 is formed by the second side 42 and the top side 43.

The axial area 30 comprises connective areas 32 connected to the branch areas 40, and non-connective areas 33 adjacent to the gap areas 60 in the first direction D1. The connective areas 32 and the non-connective areas 33 are alternately arranged in the second direction D2. Each concave portion 70 is formed in a corresponding connective area 32. Bend portions BP1 and BP2 are formed at the both ends of each concave portion 70 (in other words, at the boundaries between each concave portion 70 and corresponding convex portions 80). In the example of FIG. 6, both the bend portion BP1 and the bend portion BP2 are located in the connective areas 32. As another example, the bend portions BP1 and BP2 may be located on the extensions of the first and second sides 41 and 42 of the branch areas 40. Alternatively, the bend portions BP1 and BP2 may be located in the non-connective areas 33.

The length of each connective area 32 in the second direction D2 is L1. The length of each non-connective area 33 in the second direction D2 is L2. In the example of FIG. 6, length L1 is greater than length L2 (L1>L2). However, length L1 may be less than or equal to length L2 (L1≤L2).

The length (depth) of each concave portion 70 in the first direction D1 is L3. Length L3 is also equivalent to the length (height) of each convex portion 80 in the first direction D1. The length (width) of each non-connective area 33 in the first direction D1 is L4. The maximum length of each connective area 32 in the first direction D1 is also L4. For example, length L3 is preferably greater than or equal to 1

μm. Length L3 is preferably greater than or equal to one-third of length L4 (L3≥L4/3).

The length of each branch area 40 in the first direction D1 is L5. Each branch area 40 is an area which substantially contributes to display. As described above, the axial area 30 overlaps the light-shielding layer 21. Thus, when length L4 is much greater than length L5, the area which does not contribute to display is increased. In this way, the display quality is reduced. From this aspect, length L4 is preferably less than or equal to one-fifth of the sum of length L4 and length L5 (L4<(L4+L5)/5).

The present embodiment allows the realization of a high-speed response mode in which the response is faster than that of the common FFS mode. The speed of response can be defined as, for example, the speed when the phototransmittance of the liquid crystal layer LC is changed between predetermined levels by the voltage application between the pixel electrodes PE and the common electrode CE (specifically, the first and second common electrodes CE1 and CE2).

Figure 7:
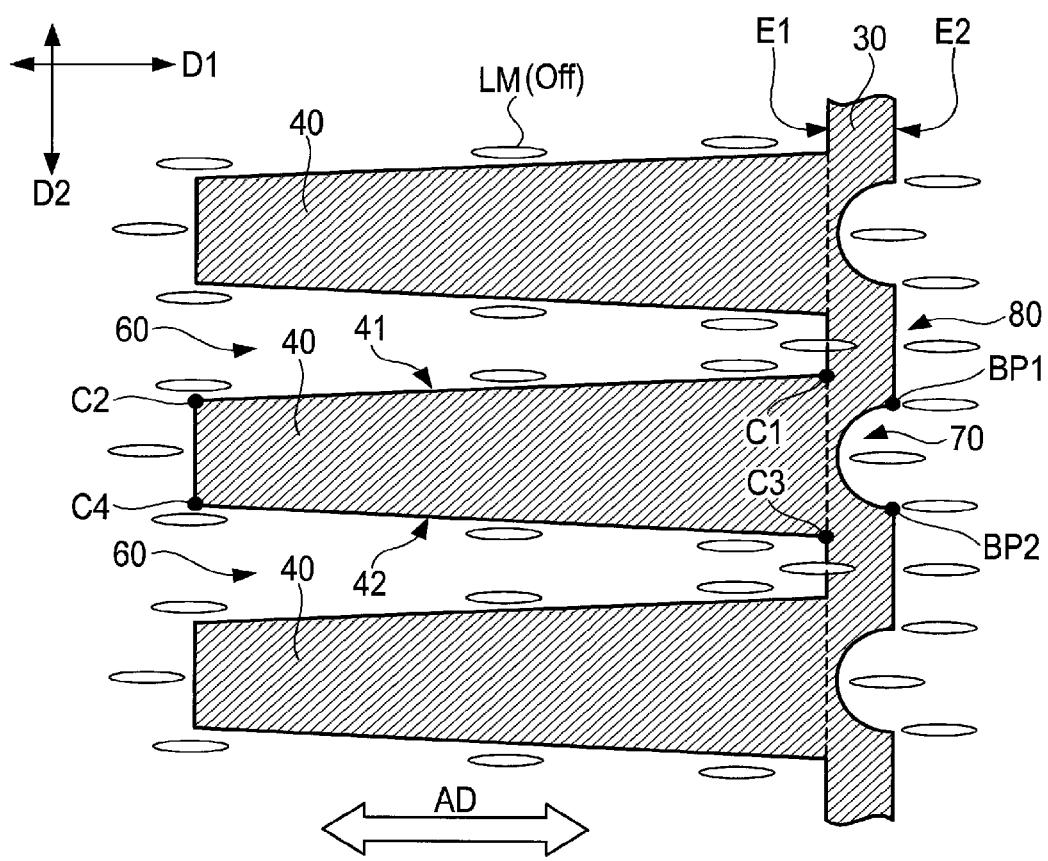
FIG. 7 shows the alignment state of liquid crystal molecules in an off-state.
Figure 8:
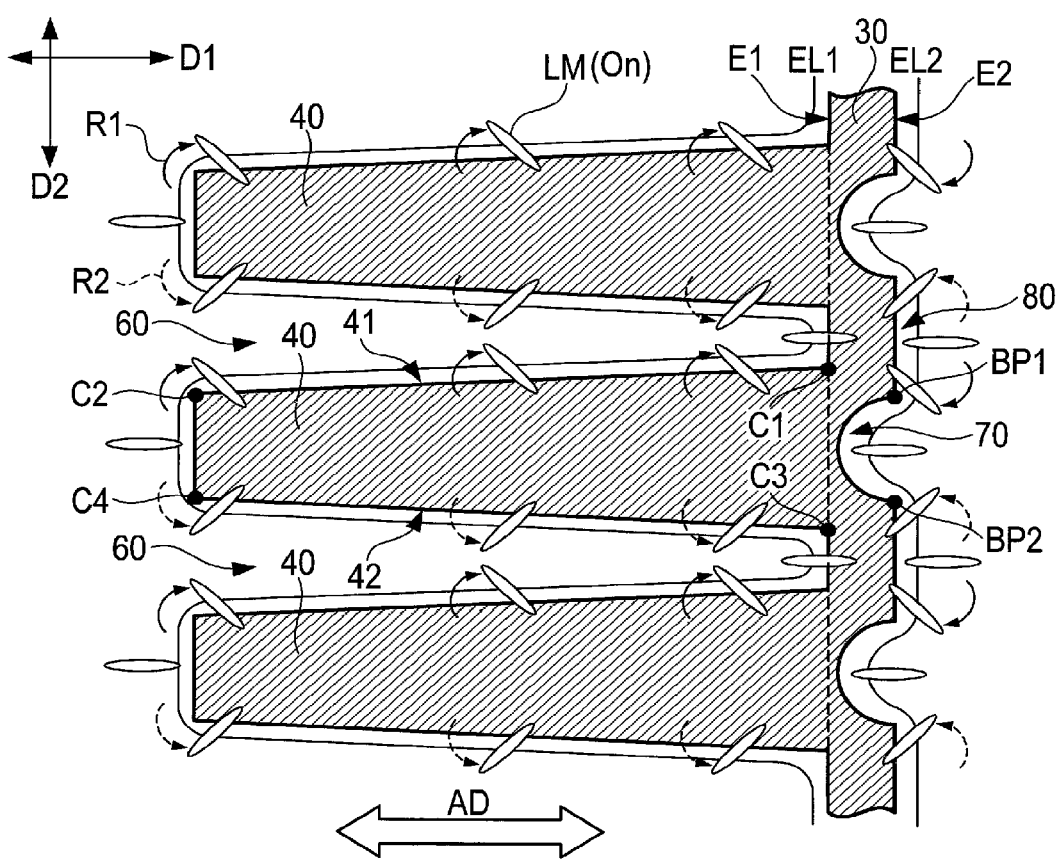
FIG. 8 shows the alignment state of liquid crystal molecules in an on-state.

Now, this specification explains the operation principle of the high-speed response mode with reference to FIG. 7 and FIG. 8.

FIG. 7 shows a part of the axial area 30 and the branch areas 40, and the initial alignment state of the liquid crystal molecules LM included in the liquid crystal layer LC. As shown in FIG. 7, the liquid crystal molecules LM are initially aligned such that the long axis conforms to the alignment treatment direction AD in an off-state where no voltage is applied between the pixel electrode PE and the common electrode CE (specifically, the first and second common electrodes CE1 and CE2).

In the common FFS mode which is widely used, all the liquid crystal molecules rotate in the same direction when a fringe electric field is formed between two electrodes. However, the rotation of the liquid crystal molecules in high-speed response mode is different from that of the liquid crystal molecules in FFS mode.

FIG. 8 shows the alignment state of the liquid crystal molecules LM in an on-state where voltage is applied between the pixel electrode PE and the common electrode CE (specifically, the first and second common electrodes CE1 and CE2). The lines EL1 and EL2 shown in FIG. 8 are examples of the equipotential lines of the electric field generated around the axial area 30 and the branch areas 40. In the liquid crystal molecules LM of the present embodiment, the dielectric anisotropy is positive. Therefore, when voltage is applied between the pixel electrode PE and the common electrode CE (specifically, the first and second common electrodes CE1 and CE2) in the off-state shown in FIG. 7, force is applied to rotate the liquid crystal molecules LM such that the long axis is made parallel to the direction of the electric field generated by the application of voltage (or is made perpendicular to the equipotential lines EL1 and EL2).

The liquid crystal molecules LM rotate in a first rotational direction R1 indicated with the solid arrows near the corners C1 and C2. The liquid crystal molecules LM rotate in a second rotational direction R2 indicated with the dashed arrows near the corners C3 and C4. The first rotational direction R1 and the second rotational direction R2 are different from (opposite to) each other.

The corners C1 to C4 have a function for controlling the alignment (in other words, a function for stabilizing the alignment) by controlling the rotational direction of the liquid crystal molecules LM near the first and second sides 41 and 42. The liquid crystal molecules LM near the first sides 41 rotate in the first rotational direction R1 in connection with the rotation of the liquid crystal molecules LM near corners C1 and C2. The liquid crystal molecules LM near the second sides 42 rotate in the second rotational direction R2 in connection with the rotation of the liquid crystal molecules LM near the corners C3 and C4. Near the center of each branch area 40 and the center of each gap area 60 in the second direction D2, the liquid crystal molecules LM rotating in the first rotational direction R1 compete with the liquid crystal molecules LM rotating in the second rotational direction R2. Thus, the liquid crystal molecules LM in these areas are maintained in the initial alignment state, and hardly rotate.

As described above, in high-speed response mode, the rotational directions of the liquid crystal molecules LM are aligned from the proximal sides to the distal sides near the first and second sides 41 and 42. Thus, when voltage is applied, a response can be made fast. Moreover, the rotational directions of the liquid crystal molecules LM can be uniform. Thus, it is possible to improve the stability of alignment.

In the branch areas 40, the first and second sides 41 and 42 are inclined with respect to the alignment treatment direction AD. This structure also contributes to the improvement of the stability of alignment. Near the first and second sides 41 and 42 inclined with respect to the alignment treatment direction AD, the direction of the electric field intersects the alignment treatment direction AD at an angle other than a right angle. Thus, it is possible to cause the rotational direction of the liquid crystal molecules LM to be substantially constant when voltage is applied.

Now, this specification explains the vicinity of the second edge E2 of the axial area 30. As described above, the second edge E2 comprises the concave portions 70 and the convex portions 80. The equipotential line EL2 meander in accordance with the shapes of the concave portions 70 and the convex portions 80. From the bend portions BP1 and BP2 to the center of each concave portion 70 in the second direction D2, the equipotential line EL2 is inclined in a direction intersecting the first and second directions D1 and D2. In this way, the liquid crystal molecules LM rotate in the first rotational direction R1 near the bend portions BP1, and rotate in the second rotational direction R2 near the bend portions BP2. Near the center of each concave portion 70 and the center of each convex portion 80 in the second direction D2, the liquid crystal molecules LM rotating in the first rotational direction R1 compete with the liquid crystal molecules LM rotating in the second rotational direction R2. Thus, the liquid crystal molecules LM in these areas are maintained in the initial alignment state, and hardly rotate.

When the liquid crystal molecules LM near the second edge E2 rotate in the above manner, the rotational directions of the liquid crystal molecules LM are aligned from the first sides 41 to the bend portions BP1. The rotational directions of the liquid crystal molecules LM are aligned from the second sides 42 to the bend portions BP2. Further, from the branch areas 40 to the concave portions 70, the liquid crystal molecules LM do not rotate at the centers of the branch areas 40 and the concave portions 70 in the second direction D2. Similarly, from the gap areas 60 to the convex portions 80, the liquid crystal molecules LM do not rotate at the centers of the gap areas 60 and the convex portions 80 in the second direction D2.

Figure 9:
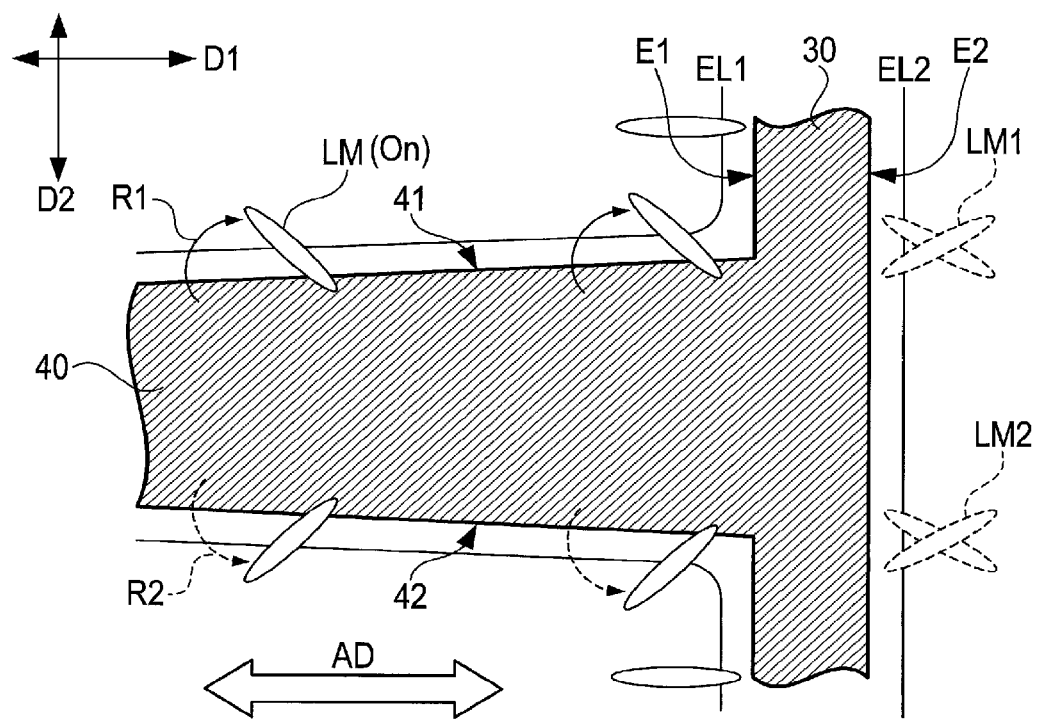
FIG. 9 shows a comparison example of the first embodiment.

FIG. 9 shows a comparison example of the present embodiment. In this comparison example, it is assumed that the second edge E2 of the axial area 30 is flat in the second direction D2. In this case, the equipotential line EL2 is parallel to the second direction D2 over the entire second edge E2. Since the equipotential line EL2 is perpendicular to the alignment treatment direction AD, the liquid crystal molecules LM near the second edge E2 are in an unstable state where the liquid crystal molecules LM could rotate in both the first rotational direction R1 and the second rotational direction R2. For example, each electrode is small in very fine pixels. Thus, the first and second rotational directions R1 and R2 of the liquid crystal molecules LM near the second edge E2 are more easily unstable.

If the liquid crystal molecules LM near the extensions of the first sides 41 rotate in the second rotational direction R2, the rotational directions of the liquid crystal molecules are not aligned between the vicinity of the first sides 41 and the vicinity of the second edge E2. Similarly, if the liquid crystal molecules LM near the extensions of the second sides 42 rotate in the first rotational direction R1, the rotational directions of the liquid crystal molecules are not aligned between the vicinity of the second sides 42 and the vicinity of the second edge E2. When the rotational directions are not aligned in this way, the speed of response is decreased near the first and second sides 41 and 42.

However, when the concave portions 70 or the convex portions 80 are provided in the second edge E2 such that the equipotential line EL2 is curved as shown in FIG. 8, the rotational directions of the liquid crystal molecules LM are aligned from the vicinity of the first and second sides 41 and 42 to the vicinity of the second edge E2. In this way, the speed of response in high-speed response mode can be further increased.

By increasing the speed of response, the image displayed by the display device 1 is swiftly switched. Thus, various excellent effects can be obtained. For example, an image can be displayed with high quality.

In the present embodiment, an area having pixel potential and an area having common potential are formed in each subpixel SP by using electrodes (PE, CE1 and CE2) formed in three different layers. The effect of this structure is explained with reference to FIG. 4 and FIG. 10.

FIG. 10 shows a comparison example of the present embodiment. This comparison example is different from the present embodiment in respect that the comparison example comprises a two-layer structure including the layer of a common electrode CEa and the layer of pixel electrodes PEa. The common electrode CEa comprises an aperture A12a for each subpixel SP. The aperture A12a overlap the pixel electrodes PEa as seen in plan view. Each aperture A12a comprises an axial area 30a, a plurality of branch areas 40a extending from the axial area 30a, a plurality of concave portions 70a and a plurality of convex portions 80a. In this comparison example, when very fine subpixels SP are provided, as shown in the arrows in FIG. 10, distance W0 between the distal end of each gap area 60a and the concave portion 70a near the gap area 60a is short. Thus, they may be short-circuited. In particular, this possibility is increased in the subpixels SP of a high-definition display device (for example, with 700 ppi or greater).

In the present embodiment, the internal side of each concave portion 70 (in other words, the extension area 50) and each gap area 60 are formed by the first common electrode CE1 and the second common electrode CE2 provided in different layers, respectively. Thus, even when distance W1 shown in with the arrows in FIG. 4 is short, the above short circuit does not occur. In another respect, each concave portion 70 can have a sufficient depth. In this way, it is possible to further improve the stability of alignment.

Since the extension area 50 is provided, as shown with the arrows in FIG. 4, distance W2 between the distal end of each gap area 60 and the edge of the aperture A12 on the video signal line S2 side can be long. Specifically, even when distance W2 is long in this manner, the length of the axial area 30 in the first direction D1 can be decreased by the provision of the extension area 50. In the three-layer structure, even when distances W1 and W2 are long, the interference or short circuit between adjacent pixel electrodes PE can be reduced. Thus, very fine subpixels SP can be easily realized. Further, the relationships of lengths L1 to L5 explained with reference to FIG. 6 can be easily realized.

In addition to the above effects, the present embodiment can improve the flexibility of designing in terms of various aspects related to the shapes of the electrodes of the subpixels SP.

The shapes of each axial area 30, each branch area 40, each extension area 50, each gap area 60, each concave portion 70 and each convex portion 80 may be modified in various ways.

For example, each concave portion 70 and each convex portion 80 may be polygonal. For example, they may be triangular or trapezoidal. Each concave portion 70 may have a shape similar to the distal end of each branch area 40. Similarly, each convex portion 80 may have a shape similar to the distal end of each gap area 60. In this disclosure, the term "similarity" includes the meaning in which two objects merely resemble each other in shape in addition to the geometric meaning in which, when one of two objects is reduced or enlarged, the object coincides precisely with the other object.

Figure 11:
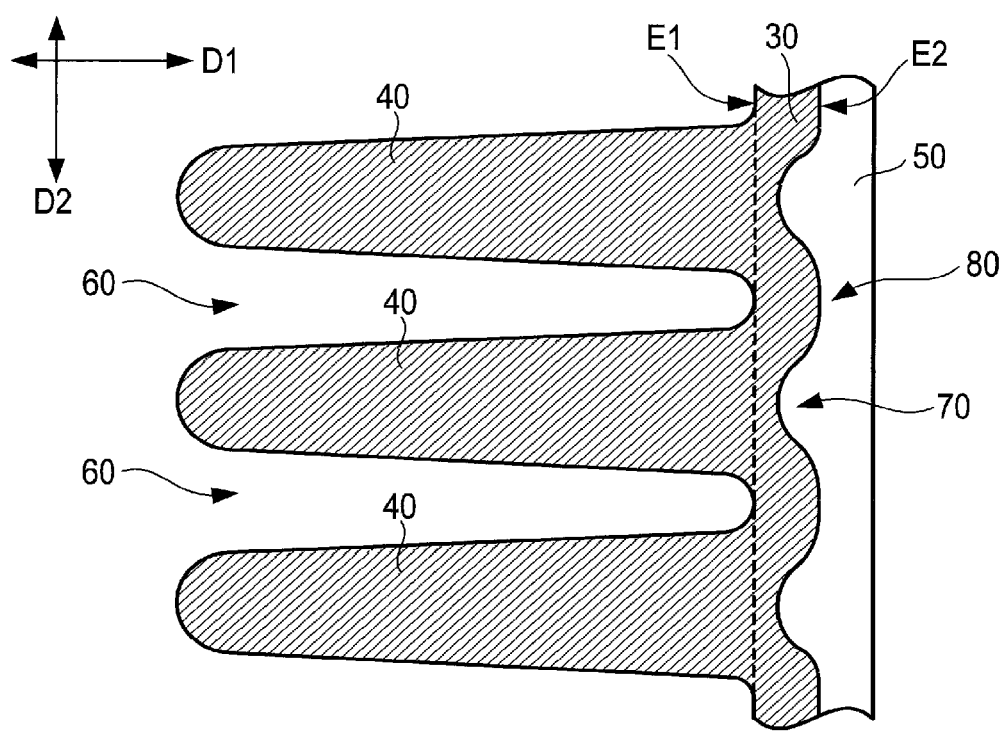
FIG. 11 shows a modification example of the first embodiment.

For example, as shown in FIG. 11, the axial area 30, each branch area 40, the extension area 50, each gap area 60, each concave portion 70 and each convex portion 80 may have a smooth outline. In the example of FIG. 11, the distal end of each branch area 40 and each gap area 60 is arcuate. The boundaries between the concave portions 70 and the convex portions 80 are also smooth. In this way, the second edge E2 of the axial area 30 is arcuate such that it smoothly meanders. In this case, the convex portions 80 are similar to the gap areas 60. The concave portions 70 are similar to the distal ends of the branch areas 40. For example, the curvature of the distal ends of the branch areas 40 is greater than the curvature of the concave portions 70. The curvature of the distal ends of the gap areas 60 is greater than the curvature of the convex portions 80.

Second Embodiment

A second embodiment is explained. The same or similar elements as/to those of the first embodiment are denoted by like reference numbers, detailed description thereof being omitted unless necessary. The structures which are not particularly referred to are the same as those of the first embodiment.

Figure 12:
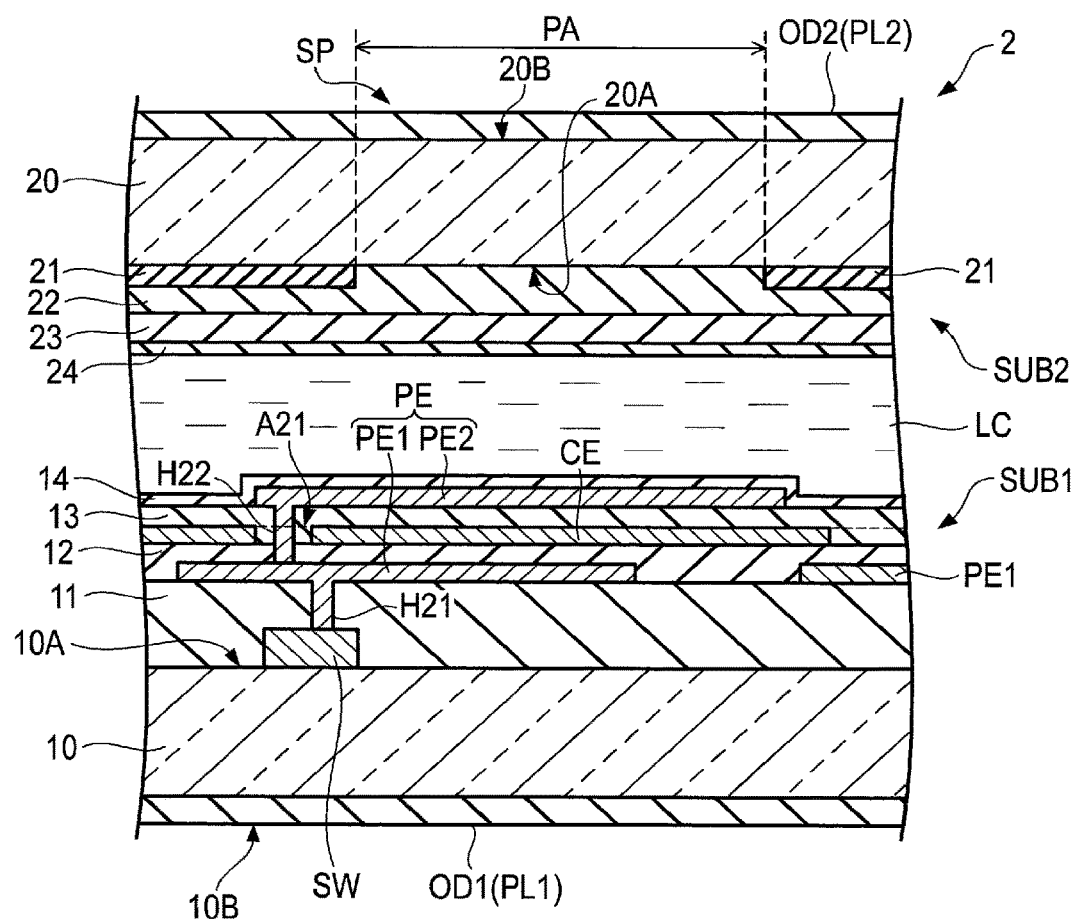
FIG. 12 shows an example of the cross-sectional surface of a display device according to a second embodiment.

FIG. 12 shows a part of the cross-sectional surface of a display panel 2 provided in a display device 1 according to the second embodiment. In a manner similar to that of FIG. 3, FIG. 12 shows the schematic cross-sectional view of a subpixel SP.

In the present embodiment, each pixel electrode PE includes a first pixel electrode PE1 and a second pixel electrode PE2. In the first embodiment, the display panel 2 comprises two common electrodes CE1 and CE2. However, in the present embodiment, the display panel 2 comprises only one common electrode CE.

The first pixel electrode PE1 is formed on a first insulating layer 11. The first pixel electrode PE1 is covered with a second insulating layer (first dielectric layer) 12. The common electrode CE is formed on the second insulating layer 12. The common electrode CE is covered with a third insulating layer (second dielectric layer) 13. The second pixel electrode PE2 is formed on the third insulating layer 13. The second pixel electrode PE2 is covered with a first alignment film 14. The first pixel electrode PE1 is connected to a switching element SW via a contact hole H21 penetrating the first insulating layer 11. The second pixel electrode PE2 is connected to the first pixel electrode PE1 via a contact hole H22 penetrating the second and third insulating layers 12 and 13 and an aperture A21 provided in the common electrode CE. The first and second pixel electrodes PE1 and PE2 and the common electrode CE can be formed of a transparent conductive material such as ITO.

Figure 14A:
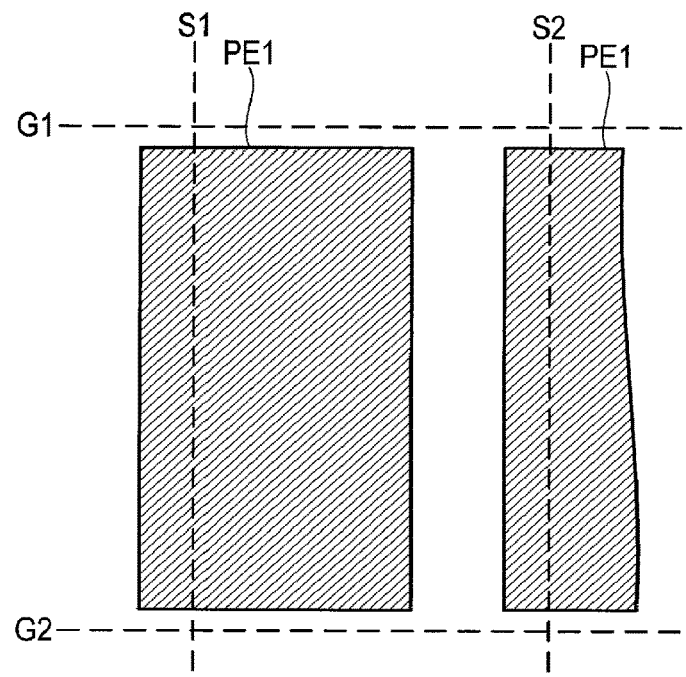
FIG. 14A is a schematic plan view of the first pixel electrode shown in FIG. 13.
Figure 14B:
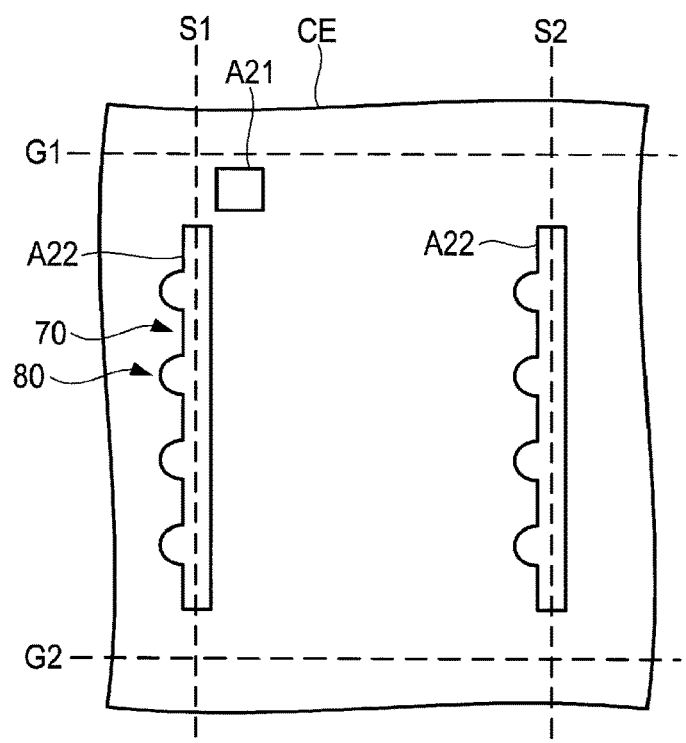
FIG. 14B is a schematic plan view of the common electrode shown in FIG. 13.
Figure 14C:
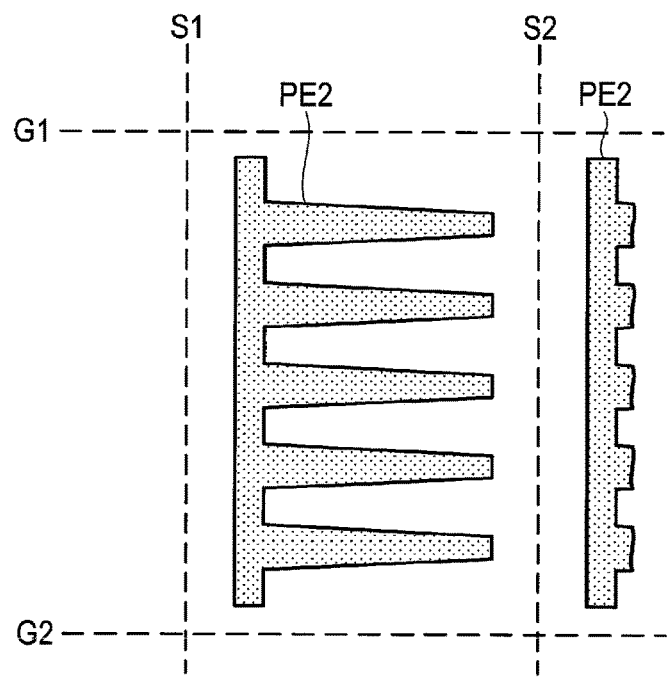
FIG. 14C is a schematic plan view of the second pixel electrode shown in FIG. 13.

FIG. 13 is a plan view schematically showing an example of a subpixel SP according to the present embodiment. FIG. 14A, FIG. 14B and FIG. 14C are the schematic plan views of the first pixel electrode PE1, the common electrode CE and the second pixel electrode PE2 shown in FIG. 13, respectively.

In the examples of FIG. 13 and FIG. 14A, the most part of the first pixel electrode PE1 is provided in the area surrounded by scanning lines G1 and G2 and video signal lines S1 and S2. In addition, the first pixel electrode PE1 extends in the area on the left side of the video signal line S1. The first pixel electrode PE1 may be provided within the area surrounded by the scanning lines G1 and G2 and the video signal lines S1 and S2.

As shown in FIG. 13 and FIG. 14B, the common electrode CE is formed over a plurality of subpixels SP. The common electrode CE comprises an aperture A22 in addition to the above aperture A21. The above contact hole H22 is provided at a position overlapping the aperture A21 as seen in plan view. Although the aperture A22 overlaps the adjacent subpixel area, the overlapping position is covered with a light-shielding layer 21. Thus, even if the electric field in a subpixel area has a slight effect on the alignment of the liquid crystal molecules in another subpixel area, the effect does not cause a large problem.

As shown in FIG. 13 and FIG. 14C, the second pixel electrode PE2 is provided in the area surrounded by the scanning lines G1 and G2 and the video signal lines S1 and S2. The second pixel electrode PE2 may extend to the outside of this area.

For example, the first pixel electrode PE1 overlaps the common electrode CE excluding the apertures A21 and A22. For example, the common electrode CE overlaps the entire second pixel electrode PE2. However, the second pixel electrode PE2 may comprise a portion which does not overlap the common electrode CE.

In each subpixel SP of the present embodiment, similarly, an axial area 30, a plurality of branch areas 40 and a plurality of gap areas 60 are provided. The axial area 30 and each branch area 40 have pixel potential. The other area including each gap area 60 has common potential. The axial area 30 comprises a first edge E1 on the video signal line S2 side, and a second edge E2 on the video signal line S1 side. Each branch area 40 extends from the first edge E1 of the axial area 30 to the video signal line S2 in a first direction D1.

The axial area 30 includes a first portion P1 on the video signal line S2 side, and a second portion P2 on the video signal line S1 side. The first portion P1 comprises the first edge E1. The second portion P2 comprises the second edge E2. Both the first portion P1 and the second portion P2 extend in a second direction D2. In the example of FIG. 13, the second portion P2 is shorter than the first portion P1 in the second direction D2. However, the first and second portions P1 and P2 may have the same length. Alternatively, the second portion P2 may be longer than the first portion P1. Both ends of the first and second portions P1 and P2 in the second direction D2 may be aligned or may not be aligned.

The second edge E2 of the axial area 30 (in other words, the edge of the second portion P2) comprises a plurality of convex portions 80 arranged in the second direction D2. Each convex portion 80 is aligned with a corresponding gap area 60 in the first direction D1. For example, the center of each gap area 60 in the second direction D2 may match the center of a corresponding convex portion 80 in the second direction D2 (in other words, the most projecting position). Although FIG. 13 shows that each convex portion 80 is semicircular, the shape of each convex portion 80 is not limited to this example.

In another respect, the second edge E2 of the axial area 30 comprises a plurality of concave portions 70 arranged in the second direction D2. Each concave portion 70 is aligned with a corresponding branch area 40 in the first direction D1. For example, the center of each branch area 40 in the second direction D2 may match the center of a corresponding concave portion 70 in the second direction D2 (in other words, the deepest position on the branch area 40 side).

The aperture A22 of the common electrode CE includes the second portion P2 and the convex portions 80. As seen in plan view, the edge of the aperture A22 on the video signal line S2 side matches the edge of the second pixel PE2 on the video signal line S1 side, or is located between the edge of the second pixel electrode PE2 on the video signal line S1 side and the first edge E1.

In the present embodiment, the first portion P1 of the axial area 30 and each branch area 40 are an area in which the second pixel electrode PE2 is present. Each gap area 60 is an area in which the second pixel electrode PE2 is not present, and the common electrode CE is present. The second portion P2 of the axial area 30 is an area in which the second pixel electrode PE2 and the common electrode CE are not present, and the first pixel electrode PE1 is present. Thus, each convex portion 80 (more precisely, the second portion P2 on the internal side of each convex portion 80) is an area in which the second pixel electrode PE2 and the common electrode CE are not present, and the first pixel electrode PE1 is present. The other area is an area in which the second pixel electrode PE2 is not present, and the common electrode CE is present. In this structure, the axial area 30 and each branch area 40 have pixel potential, and the other area has common potential.

Alignment treatment is applied to the first alignment film 14 and the second alignment film 24 shown in FIG. 12 in an alignment treatment direction AD parallel to the first direction D1. In the present embodiment, in a manner similar to that of the first embodiment, the extension directions of the branch areas 40 and the gap areas 60 are identical with the initial alignment direction of the liquid crystal molecules. In the liquid crystal molecules of the liquid crystal layer LC, the dielectric anisotropy is positive.

The same structures as the first embodiment, for example, the relationships of lengths L1 to L5 shown in FIG. 6, may be applied to the shapes of each axial area 30, each branch area 40 and each gap area 60. The various shapes explained in the first embodiment may be applied to the shapes of each concave portion 70 and each convex portion 80. For example, in a manner similar to that of the example shown in FIG. 11, the axial area 30, each branch area 40, the extension area 50, each gap area 60, each concave portion 70 and each convex portion 80 may have a smooth outline.

In the structure of the above embodiment, as explained with reference to FIG. 7 and FIG. 8, it is possible to obtain the display device 1 in high-speed response mode in which the speed of response and the stability of alignment are improved.

When the convex portions 80 are provided in the axial area 30 like the present embodiment, as shown with the arrows in FIG. 13, distance W3 between the distal end of each branch area 40 of a subpixel SP and a corresponding convex portion 80 of the adjacent subpixel SP is short. If the branch areas 40 and the convex portions 80 are formed in the same conductive layer, and distance W3 is short, they may be short-circuited. In particular, this possibility is increased in very fine subpixels SP. However, in the present embodiment, each branch area 40 and each convex portion 80 are formed by the first pixel electrode PE1 and the second pixel electrode PE2 provided in different layers, respectively. Thus, even if distance W3 is short, the above short circuit does not occur. In another respect, each convex portion 80 can have a sufficient height. In this way, it is possible to further improve the stability of alignment.

In addition to the above description, the same effects as the first embodiment can be obtained from the present embodiment.

Figure 15:
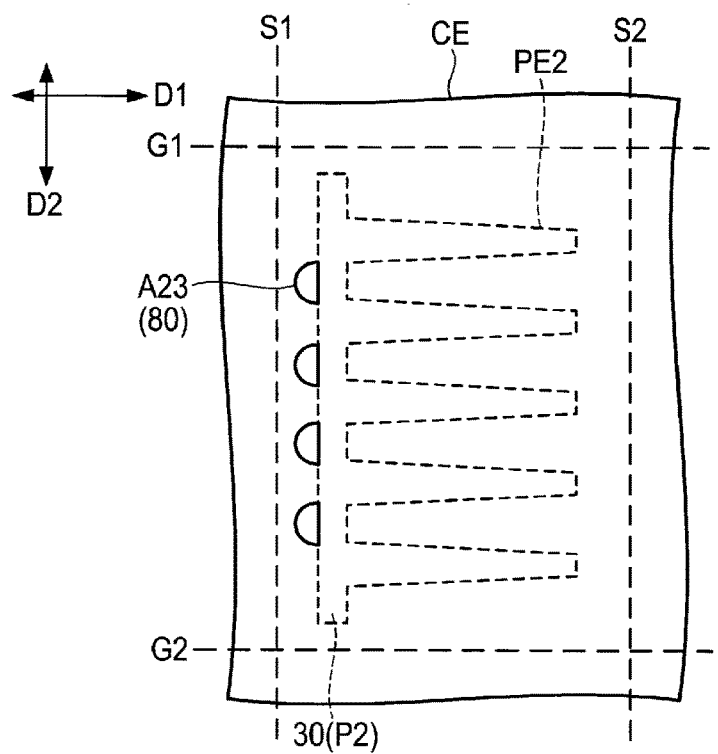
FIG. 15 shows a modification example of the second embodiment.

In the present embodiment, the axial area 30 includes the first portion P1 and the second portion P2. However, the axial area 30 may not include the second portion P2. FIG. 15 shows an example of the plane shape of the common electrode CE which can be applied in this case. In the example of FIG. 15, the common electrode CE comprises a plurality of apertures A23 arranged in the second direction D2. As seen in plan view, the apertures A23 are in contact with the axial area 30 (the second portion P2 of the second pixel electrode PE2). In this case, the first pixel electrode PE1 (not shown in FIG. 15) exposed from the apertures A23 are connected to the axial area 30. As a result, the convex portions 80 of the axial area 30 are formed.

Each embodiment discloses a structure which can be adopted when the dielectric anisotropy of the liquid crystal molecules of the liquid crystal layer LC is positive. However, the liquid crystal layer LC may be structured by liquid crystal molecules in which the dielectric anisotropy is negative. In this case, the alignment treatment direction AD (or the initial alignment direction of liquid crystal molecules) may be a direction (second direction D2) perpendicular to the extension direction (first direction D1) of the branch areas 40.

All of the display devices which may be realized by a person of ordinary skill in the art by appropriately changing the design based on the display device explained as each embodiment of the present invention fall within the scope of the present invention as long as they encompass the spirit of the invention.

Various modification examples which may be conceived by a person of ordinary skill in the art in the scope of the idea of the present invention will also fall within the scope of the invention. For example, even if a person of ordinary skill in the art arbitrarily modifies the above embodiments by adding or deleting a structural element or changing the design of a structural element, or adding or omitting a step or changing the condition of a step, all of the modifications fall within the scope of the present invention as long as they are in keeping with the spirit of the invention.

Further, other effects which may be obtained from the embodiments and are self-explanatory from the descriptions of the specification or can be arbitrarily conceived by a person of ordinary skill in the art are considered as the effects of the present invention as a matter of course.

What is claimed is:

1. A liquid crystal display device comprising:
   a first substrate;
   a second substrate; and
   a liquid crystal layer provided between the first substrate and the second substrate, and including liquid crystal molecules, wherein
   the first substrate comprises:
      a plurality of subpixels;
      a first common electrode having common potential;
      a second common electrode between the first common electrode and the liquid crystal layer, and having the common potential; and
      a pixel electrode between the first common electrode and the second common electrode, provided for each of the subpixels and having pixel potential,
   each of the subpixels comprises:
      an axial area comprising first and second edges arranged in a first direction, and extending in a second direction intersecting the first direction;
      a plurality of branch areas extending from the first edge of the axial area in the first direction; and
      a plurality of gap areas between the branch areas,
   the second edge comprises a plurality of concave portions arranged in the second direction,
   the axial area and the branch areas are areas in which the second common electrode is not present, and the pixel electrode is present,
   the gap areas are areas in which the second common electrode is present, and
   the concave portions are areas in which the second common electrode and the pixel electrode are not present, and the first common electrode is present.

2. The liquid crystal display device of claim 1, wherein the second common electrode comprises an aperture having a shape including the axial area, the branch areas and the concave portions.

3. The liquid crystal display device of claim 2, wherein the aperture further comprises an extension area extending in the second direction along the second edge of the axial area,
   the extension area is an area in which the second common electrode and the pixel electrode are not present, and the first common electrode is present, and
   the concave portions are connected to the extension area.

4. The liquid crystal display device of claim 1, wherein the axial area includes a connective area connected to the branch areas, and a non-connective area adjacent to the gap areas, and
   a width of the non-connective area in the first direction is less than or equal to one-fifth of a total width of the connective area and each of the branch areas in the first direction.

5. The liquid crystal display device of claim 4, wherein a width of the non-connective area in the second direction is greater than a width of the connective area in the second direction.

6. The liquid crystal display device of claim 1, wherein each of the branch areas comprises first and second sides arranged in the second direction, and
   when an electric field for rotating the liquid crystal molecules is generated, a rotational direction of the liquid crystal molecules differs between a vicinity of the first side and a vicinity of the second side.

7. The liquid crystal display device of claim 1, wherein the concave portions are aligned with the branch areas in the first direction.

8. The liquid crystal display device of claim 1, wherein the second substrate comprises a light-shielding layer overlapping the axial area as seen in plan view.

9. The liquid crystal display device of claim 8, wherein the light-shielding layer overlaps a distal portion and a proximal portion of each of the branch areas as seen in plan view.

10. The liquid crystal display device of claim 1, wherein a length of each of the concave portions in the first direction is greater than or equal to one-third of a length of the axial area in the first direction.

* * * * *